C. E. DAVIS.

Assignor, by mesne assignments, to THE TRANS-CONTINENTAL CAR LOCK AND SEAL COMPANY.

SEAL LOCK.

No. 11,161. Reissued May 5, 1891.

Witnesses:
W. A. Kennedy.
F. Stanley Elmore.

Inventor:
Chas E. Davis
By Burton and Burton
his Attorneys

THE NORRIS PETERS CO., PHOTO-LITHO., WASHINGTON, D. C.

UNITED STATES PATENT OFFICE.

CHARLES E. DAVIS, OF CHICAGO, ILLINOIS, ASSIGNOR, BY MESNE ASSIGNMENTS, TO THE TRANSCONTINENTAL CAR LOCK AND SEAL COMPANY, OF SAME PLACE.

SEAL-LOCK.

SPECIFICATION forming part of Reissued Letters Patent No. 11,161, dated May 5, 1891.

Original No. 362,823, dated May 10, 1887. Application for reissue filed April 24, 1889. Serial No. 308,478.

*To all whom it may concern:*

Be it known that I, CHARLES E. DAVIS, a citizen of the United States, residing at Chicago, county of Cook, and State of Illinois, have invented certain new and useful Improvements in Seal-Locks, of which the following is a description, reference being had to the accompanying drawings, in which—

Figure 1:
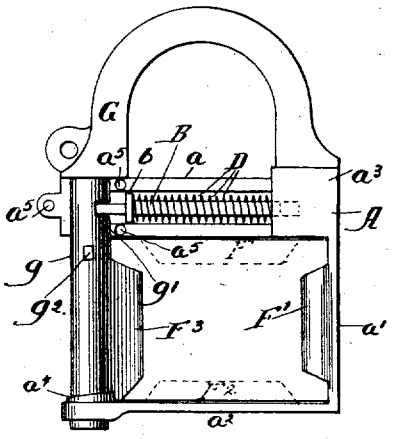
Figure 3:
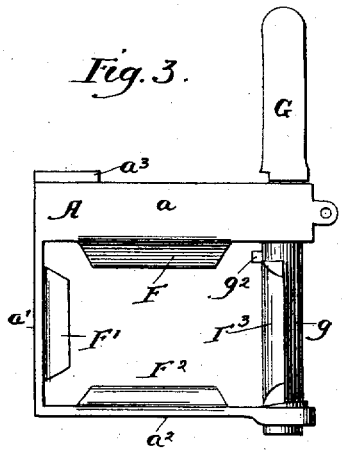
Figure 2:
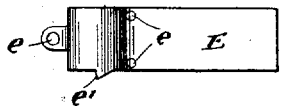
Figure 5:
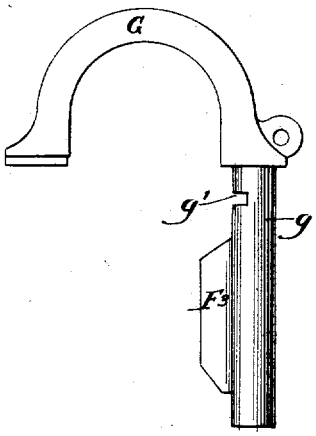
Figure 4:
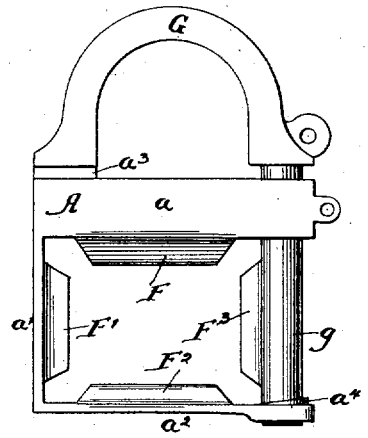

Figure 1 is a front view of the lock with the cover of the spring-bolt cavity removed. Fig. 2 is a view of said cover. Fig. 3 is a back view of the lock with the shackle revolved one-quarter of its sweep. Fig. 4 is a back view with the shackle revolved nearly to the position where it can be locked. Fig. 5 is a detached view of the shackle.

My invention relates to that class of seal-locks which are designed especially for use on railway freight-cars, and in which a frangible seal must be broken before the lock can be opened.

The object is to provide a lock which shall be very simple and durable, into which snow, ice, or other foreign matter cannot lodge to obstruct its operation, in which the seal will fall clear of the lock when broken, and in which the opening of the lock breaks the seal.

To this end it consists in the construction and combination of parts herein described, and pointed out definitely in the claims.

As illustrated in the drawings, A represents the lock frame or skeleton, which consists of three arms $a$ $a'$ $a^2$, lying substantially at right angles to each other, thereby forming three sides of the seal-recess. One of the horizontal arms, preferably the upper one $a$, is hollow, as shown in Fig. 1, and in this cavity a sliding spring-bolt B is located. This bolt is preferably actuated by a coiled spring D, which surrounds said bolt and thrusts against the rear end of the cavity at one end and against the shoulder $b$ on the bolt B at the other end, so that said bolt is under a pressure forward at all times.

E represents the cover of the bolt-cavity, which completely incloses the space and is held in place by pins $a^5$ on the case, which pass through the holes $e$ in the cover or in any appropriate manner.

G represents the shackle, which is provided with an arm $g$, extending downward from one end of said shackle. Bearings are provided in the end of the arm $a^2$ and between the arm $a$ and its cover E, in which bearings cylindrical parts of the arm $g$ are adapted to revolve. A transverse slot $g'$ is provided in said arm $g$, and so placed that when the shackle is closed, as in Fig. 1, the end of the spring-bolt B enters said slot and prevents any up-and-down motion of the shackle-arm $g$ in its bearings, although it does not in any way interfere with the revolution of said shackle-arm $g$.

On the upper front edge of the arm $a$, near the point where said arm connects with the arm $a'$, a shoulder $a^3$ is raised and adapted to engage with the free end of the shackle G. When locked by the spring-bolt B in the position shown in Fig. 1, this shoulder $a^3$ prevents the shackle from revolving in one direction and only permits it to revolve so that its free end swings away from said shoulder.

Projecting into the seal-recess from the arms $a$ $a'$ $a^2$ are the lugs or flanges F F' $F^2$ and from the shackle-arm $g$ the lug or flange $F^3$. The flanges F and $F^2$ project from the back edge of the case and the flange F' from the front edge of the case, the flange $F^3$ lying in the plane of the latter. If vertical planes be extended through the flanges F and $F^2$ and F' and $F^3$, a space about an eighth of an inch thick lies between them.

C represents a frangible seal, which in its preferable construction consists of glass coated on its back by a self-luminous paint to render it visible at night and having a monogram or other device molded on the glass to prevent counterfeiting. This seal fits within the seal-recess between the arms $a$ $a'$ $a^2$ and the arm $g'$, and it is retained in place by the flanges F, F', $F^2$, and $F^3$, the two former of which lie behind and the two latter in front of said seal and cannot be removed when the shackle is in the position shown in Fig. 1.

The operation of this device is as follows: Supposing the seal to be locked in place, as described and shown in Fig. 1, the shackle is revolved, its free end moving away from contact with the shoulder $a^3$. This forces the lug $F^3$ against the glass and necessarily breaks it, and since there is nothing to sustain the broken glass it falls to the ground, so there is no danger of the operator cutting his hand. When the shackle has been revolved about a quarter of a revolution the bolt B has been forced back out of engagement with the slot $g'$ and the shackle can be pulled upward in its bearings until the free end can pass above the shoulder $a^3$. The seal is placed in position when the shackle is in the position shown in Fig. 3, and the shackle is revolved until the free end has passed the shoulder $a^3$, when it is pressed downward. The bolt B springs into the slot $g'$ and the seal is locked in place. It cannot be removed, nor can the lock be opened without breaking said seal, as above described.

As additional improvements to the above-described lock, I provide means whereby the shackle G may be forced upward by its own revolution, so that the free end shall pass the shoulder $a^3$, and also means whereby the further revolution of the shackle will be prevented when it shall have arrived at the position to be pressed downward and locked. These means in their preferable form and located at what I consider the most convenient position are shown in the drawings. Upon the upper side of the arm $a^2$ and nearly surrounding the arm $g$ is an annular inclined flange $a^4$. The lug F′ is so arranged that as soon as in the revolution of the arm $g$ the bolt B has been forced out of engagement with the slot $g'$ its lower edge strikes the inclined flange, and as the revolution is continued the shackle is forced upward until the free end can clear the shoulder $a^3$, as shown in Fig. 4. When this free end has passed the said shoulder, a lug $g^2$ on the arm $g$ (which may or may not be a part of the flange $F^3$) strikes against the shoulder $e'$ on the arm (preferably on the cover part E thereof) and any further revolution which might accidentally break the glass seal is checked. When the shackle is pushed downward the lug $g^2$ no longer engages with the shoulder $e'$, and the parts are free to operate, as above explained.

I do not limit myself to the precise form of the last-explained part, nor to the precise location thereof, as shown, because it is evident that the lug $g^2$ and the shoulder $e'$ could be arranged at the foot of the arm $g$ and the under side of the arm $a^2$ and at other places.

The advantages of this form of lock are numerous. It is very simple and cheap. It consists of but five pieces, of which all except the spring may be cast in the form shown, and are all ready to be put together without drilling or other machine work. Fig. 1 indicates that a hole has been drilled in the arm $a$ into which the rear end of the spring-bolt B passes. This, however, is unnecessary to the successful operation of the device, its purpose being merely to give a little more steadiness to the bolt in sliding. The snow and ice cannot get at the locking mechanism, and, indeed, there is no place where snow and ice and other foreign matter can find a lodgment or impede in any way the working of the device. There is no place for the broken glass to lodge and be liable to cut the fingers of the operator, nor is the operator obliged to put his fingers into the seal-recess to open the lock, as in other devices. It is so constructed that an operator can open the lock in cold weather as well with his mittens or gloves on as with them off.

I claim—

1. In a seal-lock, the combination of the frame, a revolving shackle which is permitted to revolve from its closed position in one direction only, with a frangible seal, and means whereby the revolution of said shackle necessarily breaks the seal, substantially as and for the purpose set forth.

2. In a seal-lock, in combination with the frame having a space to receive the seal, the shackle having bearings in the frame and adapted to have both rotary and longitudinal movement in its said bearings and having a seal-breaking portion which is moved into the seal-receiving space by the rotary movement of the shackle from closed position, and suitable means which prevent the longitudinal movement of the bolt from that position, substantially as and for the purpose set forth.

3. In a seal-lock, in combination with the frame having a space to receive a seal and suitable projections to assist in retaining the seal in such space, the shackle having bearings in the frame and adapted to have rotary and longitudinal movement in said bearings and having a projection which co-operates with the projections on the frame to retain the seal when the shackle is in closed position and adapted to break the seal by its rotation from that position, and a catch which engages the shackle when it is in closed position to prevent its longitudinal movement from said position, substantially as and for the purpose set forth.

4. In a seal-lock, in combination with the frame having a space to receive a seal, the shackle having bearings in the frame and adapted to have rotary and longitudinal movement in said bearings and having a seal-breaking portion which moves into the seal-receiving space when it is rotated from closed position, and a catch which engages the shackle when it is in closed position to prevent its longitudinal movement from that position, whereby the movement of the shackle from closed position is limited to such movement as breaks the seal, substantially as set forth.

5. In a seal-lock, in combination with the frame having a seal-holding space, a shackle journaled in said frame and adapted when in one position to retain the seal in the frame, said shackle having a seal-breaking portion which moves into the seal-space to break the seal when it is rotated in one direction from its seal-breaking position, and two devices to detain the shackle at its seal-retaining position, one stopping its rotation in one direction from that position and the other preventing its longitudinal movement, whereby it might escape from the first stop, substantially as set forth.

6. In a seal-lock, in combination with the frame having a space to receive the seal, the shackle having bearings in the frame and having capacity for longitudinal and rotary movement in said bearings and having a seal-breaking portion which moves into the seal-receiving space when it is revolved in one direction from its closed position, a catch which engages the shackle when it is in closed position and prevents its sliding movement from that position, and a stop on the frame engaging the shackle when it is in closed position and preventing its revolving movement in the direction opposite to that which brings the seal-breaking portion into the seal-space, substantially as set forth.

7. In a seal-lock, in combination with a frame having a space to receive a seal, the shackle having bearings in the frame and adapted to revolve and slide in its said bearings and having a seal-breaking portion which moves into the seal-receiving space when the shackle is revolved in one direction, a stop on the frame with which the shackle becomes engaged by longitudinal movement, whereby when so engaged the rotary movement of the shackle is prevented in one direction, and a catch which engages the shackle to prevent its longitudinal movement away from the position in which it is engaged by said stop, whereby from that position the shackle is prevented from moving except by rotary movement in one direction, substantially as set forth.

8. In a seal-lock, in combination with the frame having a space to receive the seal, the shackle having bearings in the frame and adapted to have rotary and longitudinal movement in said bearings and having a seal-breaking portion which moves into the seal-receiving space when it is rotated from closed position and having a square-shouldered transverse notch, and a spring-catch suitably retained in the frame and adapted to engage in said square-shouldered notch when the shackle is in closed position, whereby it prevents the longitudinal movement of the shackle from that position, substantially as set forth.

9. In a seal-lock, in combination with the frame having a space to receive a seal and having suitable projections to assist in retaining the seal therein, the shackle journaled on the frame and having a projection which co-operates with the projections on the frame to retain the seal therein when the shackle is in one position, said projection being brought into its seal-retaining position by the rotary movement of the bolt, and means, substantially as described, for preventing the bolt from being moved out of seal-retaining position by rotary motion in the direction opposite that by which it comes into seal-retaining position, substantially as set forth.

10. In a seal-lock, the combination of a frame having three arms, a bolt-cavity in one arm, a cover for said cavity, bearings in the free ends of the two arms, a shackle having one arm extended and adapted to revolve in said bearings, a transverse slot in said extended arm, a spring-bolt, a frangible seal, and means for preventing the revolution of the shackle in more than one direction from its closed position, substantially as set forth.

11. In a seal-lock, the combination of a lock-frame having three arms which form sides of a seal-recess and seal-retaining lugs on said arms, a revolving shackle having an extended arm which forms the remaining side of said recess and is provided with a seal-retaining lug, means, substantially as described, for preventing said shackle from revolving in more than one direction from its closed position, means, substantially as described, which prevent it from moving up from its closed position, a frangible seal, and an inclined annular flange on the lock-frame surrounding the shackle-arm, substantially as and for the purpose set forth.

12. In a seal-lock, the combination of a lock-frame consisting of three arms forming three sides of a seal-recess, a revolving shackle with an extended arm forming the fourth side thereof, and means for preventing the revolution of said shackle in more than one direction from its closed position, with a frangible seal, means for retaining the seal in the seal-recess, and a lug on the extended shackle-arm adapted to engage a shoulder on an arm of the lock-frame, substantially as and for the purpose set forth.

13. In a seal-lock, the combination of a lock-frame and a revolving shackle having an extended arm and means for holding a seal in the space between said frame and shackle-arm, with the shoulders $a^3$ and $e'$ and lug $g^2$, which permit the shackle to revolve only in one direction from its locked position and to make only one complete revolution before it must be again locked, substantially as and for the purpose specified.

14. In a seal-lock, the combination of a lock-frame, a spring-bolt operating in a cavity in one arm thereof, a revolving shackle having one arm extended, and a transverse slot in said extended arm, with the shoulder $a^3$, the annular inclined flange $a^4$, and the lugs F F′, $F^2$, and $F^3$, substantially as and for the purpose set forth.

In testimony whereof I have set my hand, in the presence of two witnesses, at Chicago, Illinois, this 11th day of April, A. D. 1889.

CHARLES E. DAVIS.

Witnesses:
CHAS. S. BURTON,
JEAN ELLIOTT.